United States Patent
McMullen et al.

(10) Patent No.: US 9,706,353 B1
(45) Date of Patent: *Jul. 11, 2017

(54) PROVIDING GEOGRAPHIC LOCATIONS OF A USER'S WIRELESS DEVICE

(71) Applicant: Sprint Communications Company L.P., Overland Park, KS (US)

(72) Inventors: Michael P. McMullen, Leawood, KS (US); Rodney D. Nelson, Overland Park, KS (US); John R. Schuler, Atlanta, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/333,761

(22) Filed: Jul. 17, 2014

Related U.S. Application Data

(63) Continuation of application No. 12/142,655, filed on Jun. 19, 2008, now Pat. No. 8,838,131.

(51) Int. Cl.
  *H04M 11/04* (2006.01)
  *H04W 4/02* (2009.01)
  *H04W 64/00* (2009.01)

(52) U.S. Cl.
  CPC ......... *H04W 4/021* (2013.01); *H04W 64/003* (2013.01)

(58) Field of Classification Search
  CPC .......................... H04W 4/021; H04W 64/003
  USPC ...................... 455/456.1–456.3, 404.1–404.2
  See application file for complete search history.

(56) References Cited

U.S. PATENT DOCUMENTS

| | | | |
|---|---|---|---|
| 7,224,956 B1 | 5/2007 | O'Neil | |
| 7,231,218 B2 | 6/2007 | Diacakis et al. | |
| 2006/0050672 A1 | 3/2006 | Shim et al. | |
| 2006/0273893 A1 | 12/2006 | Warner | |
| 2007/0135090 A1* | 6/2007 | Martin | H04W 4/22 455/404.2 |
| 2007/0281689 A1 | 12/2007 | Altman et al. | |
| 2007/0287473 A1 | 12/2007 | Dupray | |
| 2008/0039059 A1 | 2/2008 | Mullen | |

(Continued)

FOREIGN PATENT DOCUMENTS

WO  2008018165 A1  2/2008

OTHER PUBLICATIONS

Valerie Bennett, et al., "Developing and Deploying a Location-Based Service Application," May 29, 2002, 8 pages, http://www.ibm.com/developerworks/websphere/library/techarticles/0205_bennett/bennett.

(Continued)

*Primary Examiner* — Wayne Cai

(57) ABSTRACT

A method, system, and medium are provided for determining the identity of a user associated with a wireless device located near a geographic location at a specific time. In response to the occurrence of an event at a geographic location, a request can be issued by a wireless provider to users of wireless devices to provide the geographic locations of their respective devices and their identities to one or more entities. Upon receiving an affirmative response to the request, the wireless provider communicates information to the entities allowing the entities to contact the users to solicit information regarding the occurrence of the event. A wireless provider may send a request for authorization to users of wireless devices to provide geographic locations when the wireless device enters a predefined geographic area.

19 Claims, 8 Drawing Sheets

(56) References Cited

U.S. PATENT DOCUMENTS

2008/0108370 A1    5/2008   Aninye
2008/0186165 A1    8/2008   Bertagna et al.
2008/0186166 A1    8/2008   Zhou et al.
2009/0258636 A1   10/2009   Helvick

OTHER PUBLICATIONS

Non-Final Office Action dated Mar. 5, 2015 in U.S. Appl. No. 14/333,994, 12 pages.
Final Office Action dated Nov. 2, 2015 in U.S. Appl. No. 14/333,994, 11 pages.
Notice of Allowance dated Feb. 8, 2016 in U.S. Appl. No. 14/333,994, 8 pages.
First Action Interview Preinterview Communication dated Feb. 27, 2017 in U.S. Appl. No. 15/154,561, 4 pages.
Notice of Allowance dated May 3, 2017 in U.S. Appl. No. 15/154,561, 17 pages.

* cited by examiner

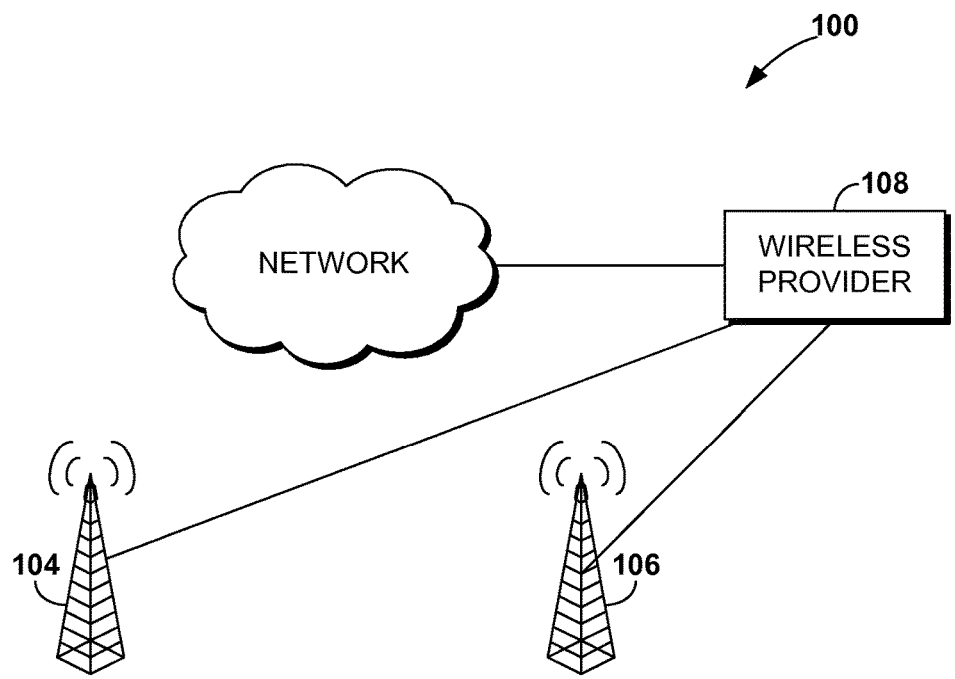
*FIG. 1*
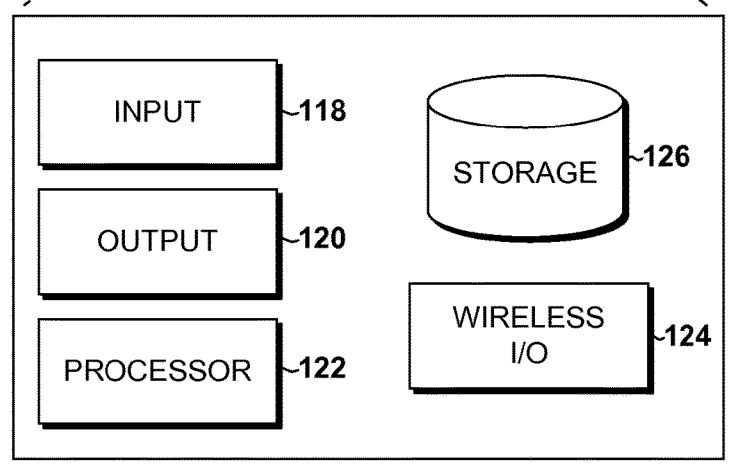

PROVIDING GEOGRAPHIC LOCATIONS OF A USER'S WIRELESS DEVICE

PRIORITY

This application is a continuation of U.S. patent application Ser. No. 12/142,655, entitled "Providing Geographic Location of a User's Wireless Device," filed 19 Jun. 2008, which has issued as U.S. Pat. No. 8,838,131 B1 on 16 Sep. 2014 and which is hereby incorporated by reference in its entirety.

BACKGROUND

Wireless devices are often able to provide geographic locations to third parties. To generate geographic locations, a variety of methods can be employed, both by the wireless device and a wireless service provider. Common to all of them is the ability to provide the geographic location of a wireless device with some degree of accuracy. These geographic locations can be employed by third parties to provide services such as advertisements to a user of the wireless device.

SUMMARY

The invention is defined by the claims below. A high-level overview of embodiments of the invention are provided here for that reason, to provide an overview of the disclosure.

In a first embodiment, a method for determining the identity of a user associated with a wireless device located near a geographic location at a specific time is provided. The method comprises receiving an authorization from users to have geographic locations associated with their wireless devices made available to entities. In response to the occurrence of an event at a specific location, a request is received from the entities for the identity of users of wireless devices. A list of users of wireless devices located within a predefined distance from a specific location within a period of time is generated. This list includes identifying information for each of the users.

In a second embodiment, a method is provided in a computer system for providing geographic locations of a wireless device associated with a user to entities. The method comprises communicating a request for authorization to provide geographic locations of the wireless device in response to the occurrence of an event. A response is received to the request for authorization from a user of the wireless device. When an affirmative response is received to the request for authorization, geographic locations is provided to entities.

In a third embodiment, computer-readable media with computer executable instructions are provided for performing a method for disclosing to entities the identity of users of associated wireless devices located within a geographic boundary. In response to the occurrence of an event at a geographic location, a request is received from entities for the identity of users of associated wireless devices located within a geographic boundary, wherein the geographic boundary includes the geographic location of the occurrence of the event. The request is received by a wireless service provider. The identity of wireless devices located within the geographic boundary is determined by the wireless service provider. The identity of the wireless devices and associated users is disclosed to entities by the wireless service provider when the associated users have previously consented to the disclosure of geographic locations.

BRIEF DESCRIPTION OF THE SEVERAL VIEWS OF THE DRAWINGS

Illustrative embodiments of the invention are described in detail below with reference to the attached drawing figures, which are incorporated by reference herein and wherein:

FIG. 1 depicts a wireless network system, in accordance with an embodiment of the invention;

DETAILED DESCRIPTION

Figure 2A:
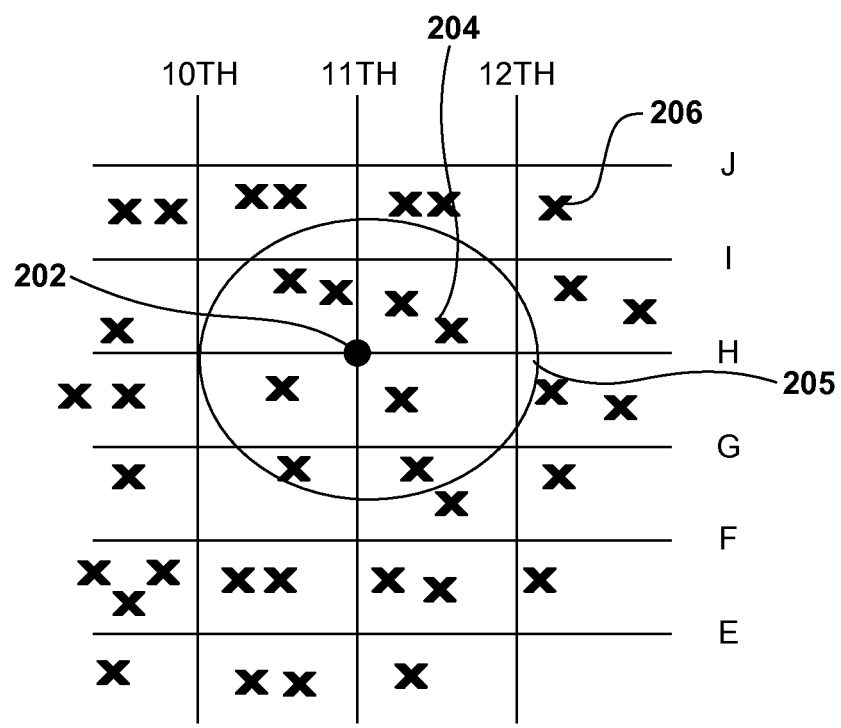
FIG. 2A depicts a map of the position of wireless devices, according to one embodiment of the invention.

Embodiments of the invention provide methods for determining the identity of a user associated with a wireless device located near a geographic location at a specific time. Other embodiments of the invention provide systems for providing geographic locations of a wireless device associated with a user. Alternative embodiments of the invention provide computer-readable media for performing a method for disclosing the identity of users of associated wireless devices located within a predefined geographic boundary.

Embodiments of the invention may include, among other things: a method, system, or computer-program product. Accordingly, the embodiments include a hardware embodiment, a software embodiment, or a combination of software and hardware. In one embodiment, the invention takes the form of a computer-program product that includes computer-useable instructions executed or stored on computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a depiction of a wireless network system 100 is presented, in accordance with an embodiment of the invention. The wireless network system 100 includes network 102, which may be any type of network known in the art, such as, but not limited to, the Internet, an intranet, a local area network (LAN), or a wide area network (WAN). As such networks are well known in the art, no further description will be provided. Base stations 104 and 106 are communicatively connected to the wireless provider 108 and provide for the communication between the wireless devices 110 and 112 and the wireless provider 108 and, in turn, the network 102. Wireless provider 108 can be any wireless service provider that provides wireless communication services to users of wireless devices 110 and 112. Wireless devices 110 and 112 may be defined as cell phones, smart phones, PDAs, or any other computing device that is capable of wireless communication. This definition includes laptop computers that have wireless communication capabilities.

While only two base stations 104 and 106 and two wireless devices 110 and 112 are depicted, it should be understood that a multitude of base stations 104 and 106 and wireless devices 110 and 112 may be utilized according to embodiments of the invention. The simplified depiction in FIG. 1 is provided to aide in the understanding of the concepts of embodiments of the invention and is not intended to limit the wireless network system 100.

Wireless device 112 includes an input component 118, an output component 120, a processor component 122, a wireless input/output (I/O) component 124, and a storage component 126. Wireless device 110 contains the same or similar components. Input component 118 provides for the input of information in the wireless device 112. Input component 118 may be a keypad, keyboard, microphone, selection device, mouse, track ball, or any other device that provides for the input of information into the wireless device. While two wireless devices 110 and 112 are depicted in FIG. 1, further description will only reference wireless device 112 for the sake of clarity.

Output component 120 provides for the output of information from the wireless device 112. The output component 120 is for the output of visual, audible, vibratory, or other forms of information. Visual forms of the output component 120 can take the form of an LCD display, plasma display, or any other display method that provides for the presentation of visual information to a user of the wireless device 112.

Processor component 122 provides computer processing functionality for the wireless device 112. Processor component 122 serves to control the functioning of the wireless device 112 and the functioning of the components of wireless device 112.

Storage component 126 provides for the storage of information on the wireless device 112. Storage component 126 can be a hard disk drive, differing types of computer memory, or any other suitable computer storage media. Common to all types of storage components 126 is the ability to store computer executable instructions.

Wireless I/O component 124 provides for the communication of wireless device 112 with the wireless provider 108 through base stations 104 and 106, and, in turn, the network 102. Wireless I/O component 124 can take many forms, such as a receiver and transmitting module for the reception of radio frequency waves and generation of the same. Common to all forms of wireless I/O components 124 is the ability to send and receive communications wirelessly.

Turning now to FIG. 2, a depiction of a map showing the position of wireless devices is provided. Generally, FIG. 2 provides a typical street map overlaid with the position of wireless devices 204 and 206, each denoted by an "X" symbol.

The "X" symbol 202 represents the specific geographic location of an occurrence of an event. This event can be any number of events, including, for example, the commission of a crime, an accident, child abduction, an alleged crime, a prank, or any other type of event. The geographic boundary 205 represents a geographic boundary surrounding the specific location. The geographic boundary 205 is useful in defining a boundary, inside of which lie wireless devices that were located in the vicinity of an event. The users of the wireless devices and by association the users' wireless devices 204 and 206, located in the vicinity of an event may have been a witness to the event and may be able to provide useful information to entities, such as law enforcement organizations (LEOs). Different types of events can warrant differing sizes of a geographic boundary 205. For instance, a relatively minor automobile collision may only warrant the creation of a geographic boundary 205 of a few blocks in size.

Wireless device 204 is within the geographic boundary 205, while wireless devices 206 are outside. The determination of the geographic locations of the wireless devices 204 and 206 can be accomplished through numerous methods, such as the use of GPS or assisted GPS. In addition, triangulation methods can be used when a wireless device 204 or 206 is able to receive signals from two or more base stations 104 and 106.

Figure 2B:
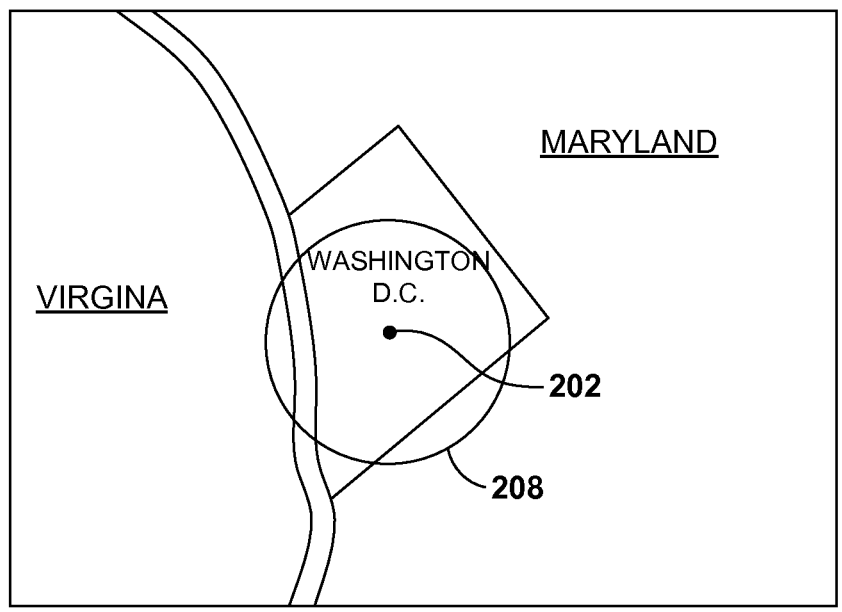
FIG. 2B depicts a map of a geographic radius from the occurrence of an event, according to an embodiment of the invention.

With reference now to FIG. 2B, a depiction is provided of a map showing a geographic radius from the occurrence of an event, according to an embodiment of the invention. The specific location 202 represents the geographic location of an occurrence of an event. This event can be any number of events, including, for example, the commission of a crime. The geographic boundary 208 represents a geographic boundary surrounding the specific location 202. The geographic boundary 208 is similar in concept to that of the geographic boundary 205, as presented in FIG. 2A. However, the geographic boundary 208 is much larger than the geographic boundary 205. A geographic boundary 208 of this size can be generated in response to an event of greater seriousness, such as the commission of a violent crime.

Wireless device 204 is within this boundary, while wireless device 206 is outside of geographic boundary 208. Neither of the wireless devices 204 or 206 are depicted for the sake of clarity in FIG. 3. It should be understood that any number of wireless devices 204 may be located within the geographic boundary 208, and a multitude of wireless devices 206 can be located outside the boundary 208. The determination of the geographic locations of the wireless devices 204 and 206 can be accomplished through numerous methods, such as the use of GPS or assisted GPS. In addition, a triangulation method can be used when a wireless device 204 or 206 is able to receive signals from two or more base stations 104 and 106.

Figure 2C:
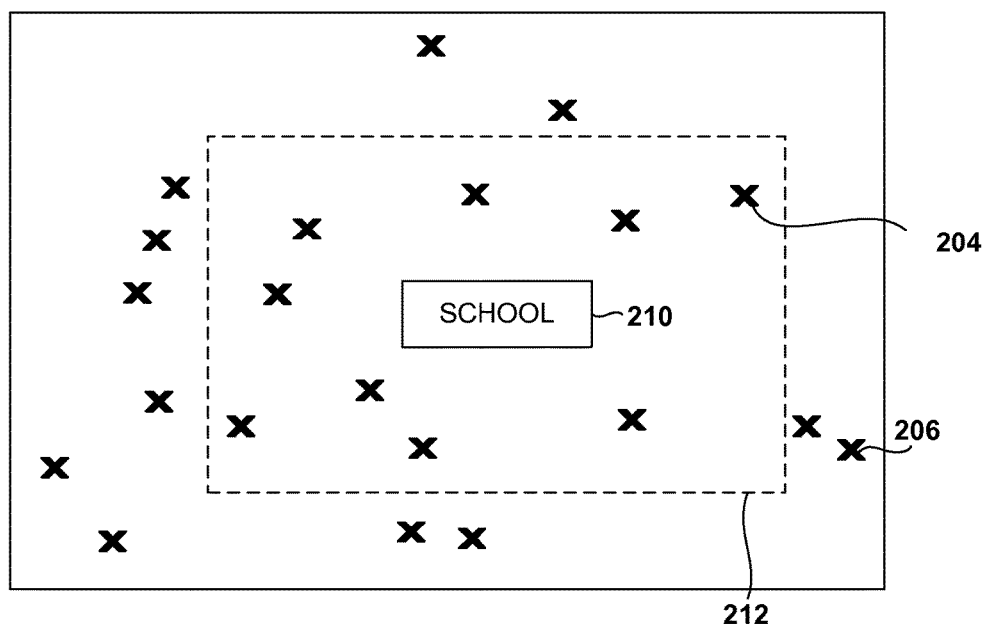
FIG. 2C depicts a map of a geographic boundary and the position of wireless devices, in accordance with an embodiment of the invention.

Turning now to FIG. 2C, a depiction is provided of a map showing a geographic boundary and the position of wireless devices, according to an embodiment of the invention. The geographic boundary 212 serves to encompass a geographic area around a particular location 210, in this instance a school. Wireless devices 204 are located within the geographic boundary 212, and wireless devices 206 are located outside the geographic boundary 212. Determining the location of the wireless device 204 and 206 may be accomplished according to GPS, assisted GPS, triangulation, or any other appropriate method.

The geographic boundary 212 can be implemented to determine when to request an authorization from the user of the wireless devices 204 and 206 to report their geographic location to LEOs. For instance, a user can be provided with an alert to their respective wireless device in accordance with the embodiment of the invention discussed in relation to FIG. 3. However, the alert can differ, and instead of being generated in response to the occurrence of an event, be generated to prevent the occurrence of an event. One example would be the generation of an alert to request authorization to provide the geographic locations of the user's respective wireless device 204 or 206 when in the vicinity of a school, such as school 210. The user can be given the opportunity to consent or not consent. The geographic boundary 212 would define the area in the vicinity of the school 210. Therefore, when the wireless device of the user entered the geographic boundary 212, the geographic locations would be made available to LEOs. This could be particularly useful in cases of child abduction, or other crimes that often occur near schools.

While specific mention has been made to schools, all types of locations could be included in the center of geographic boundaries. For instance, sporting fields, high-crime areas, or any other location could serve as the center of a geographic boundary, according to alternative embodiments of the invention.

Figure 3:
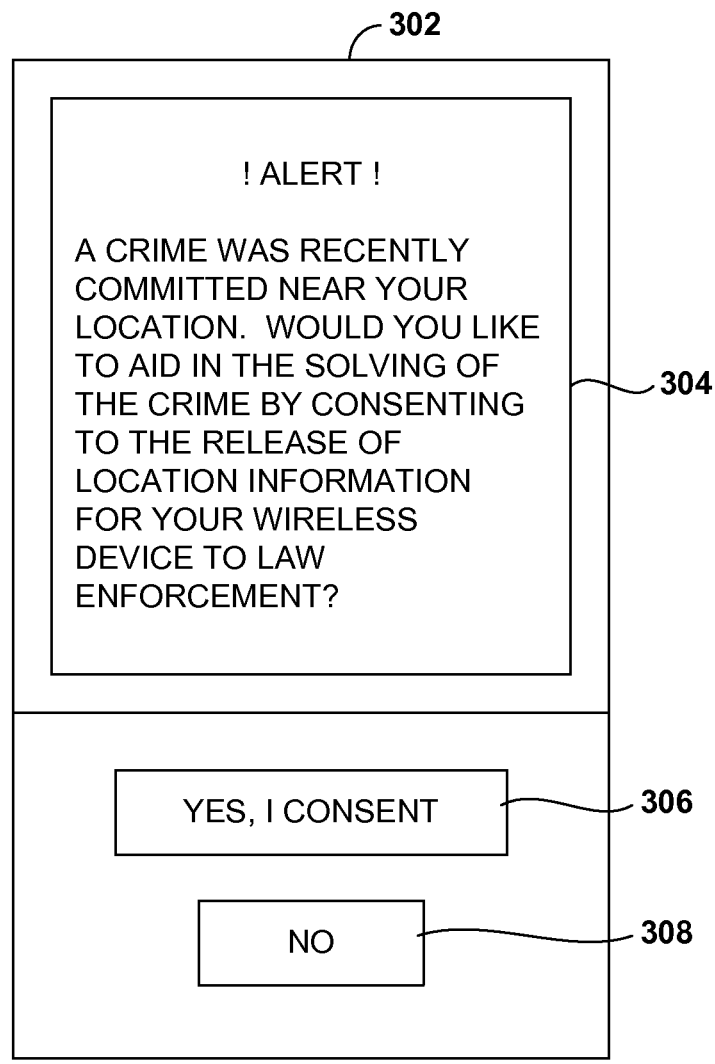
FIG. 3 depicts an exemplary screen shot of a user interface on a wireless device, in accordance with an embodiment of the invention.

With reference now to FIG. 3, a depiction is presented of an exemplary screen shot of a user interface on a wireless device, in accordance with an embodiment of the invention. The wireless device display 302 contains a window 304, along with affirmative response button 306 and negative response button 308. As depicted in window 304, an alert is provided for display on the wireless device display 302. The text alert can contain information detailing the occurrence of an event, such as a commission of a crime. This alert can be sent to wireless devices located within the geographic boundary. The alert informs the user of the occurrence of an event and asks the user if they will be able to provide information to aid in the investigation of the crime. The user can consent to the release of location information for their respective wireless device to LEOs. The user can indicate an affirmative response by selecting the affirmative response button 306, or a negative response by selecting the negative response button 308. The text represented in the affirmative response button 306 and the negative response button 308 can vary from that depicted in FIG. 3. Additionally, while specific examples have been provided for text-based alerts, other forms are contemplated, such as audio or visual alerts.

When the user provides an affirmative response, the geographic location of their wireless device and their identity will be made available to entities, such as LEOs. The affirmative response can be communicated by the wireless I/O component of the wireless device to the base stations, and then through the wireless provider to the network.

The time frame for which the information is provided to the entities can be restricted. For instance, if the event in question occurred at 3:00 PM on May 19, 2008, the entities may only be provided with the geographic locations of the wireless device from 2:30 PM to 3:30 PM on May 19, 2008. The alert can notify users that only a limited portion of their geographic locations would be made available if they issue an affirmative response to the request.

Upon reception of an affirmative response to the request, the identities of the users who issued the affirmative response can be forwarded to entities by the wireless provider. Included with the identity can be geographic locations for the wireless device, as well as other information identifying the user or the wireless device. This forwarding can be effectuated over the network, or any other suitable method for communicating the information. The entities can then contact the user and solicit information from the user. The information solicited from the user can include descriptions as to what the user may have witnessed.

The alert can be generated by a wireless provider in response to a request from entities. These entities can be LEOs, according to an embodiment of the invention. The LEOs can request the identity of users who were in the vicinity of the occurrence of the event. The wireless provider can implement various methods to verify the authenticity of the request, such as the requirement that the request take a form similar to that of subpoena issued by a court. The wireless provider can also implement other methods to verify the veracity of the request.

When defining the geographic radius that will define the boundaries of which wireless devices will receive the request, the LEOs can provide the geographic radius, or the wireless provider 108 can define the geographic radius. As discussed above, different types of events can warrant different sizes of geographic radii. In addition, the area need not be defined by a geographic radius and could instead be defined by any number of geographic boundaries. Examples include political subdivision boundaries, geographic areas bounded by streets or roads, or geographic areas defined by latitude and longitude coordinates.

Upon receiving information describing the geographic radius, the wireless provider can determine the wireless devices that were located within a geographic boundary defined by the geographic area or radius. The wireless provider can then send an alert. The wireless provider can communicate the alert to the base stations, which will in turn communicate the text alert to the wireless devices in the geographic radius.

Figure 4:
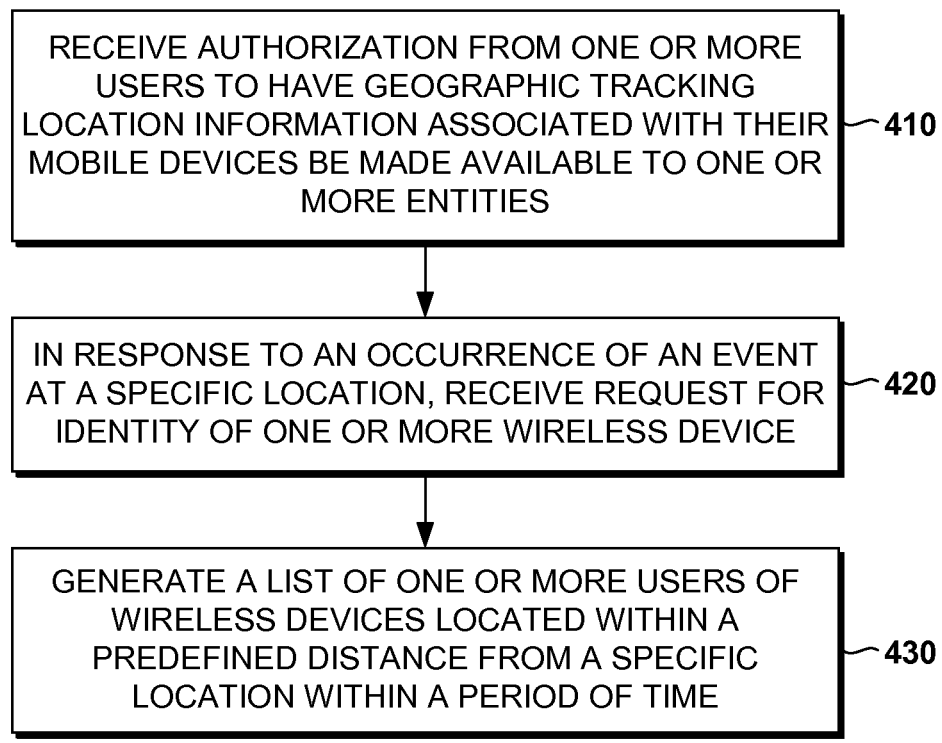
FIG. 4 depicts a flow diagram for a method of determining the identity of a user associated with a wireless device, according to one embodiment of the invention.

With reference now to FIG. 4, a flow diagram is depicted for a method of determining the identity of a user associated with a wireless device, according to an embodiment of the invention. In block 410 an authorization is received at the wireless provider from users to have geographic locations associated with their wireless device be made available to entities. According to this embodiment of the invention, a request for authorization can be generated prior to the occurrence of an event and therefore be preventive in nature. The request for authorization can include geographic locations for which the user is consenting to having their geographic locations associated with their wireless made available to entities when the wireless device is in the vicinity of the geographic boundary.

Additionally, a user could consent to blanket authorization, where the geographic locations of their respective wireless device could be made available to the entities upon their request. This blanket authorization can require the entities execute a formal process before being permitted to receive the geographic locations. This process could be supervised by the judicial branch, and be similar in function to issuance of a subpoena. Therefore, in exchange for the blanket authorization, the entities would have to surmount judicial "hurdles" before being permitted to lawfully receive the geographic locations.

Furthermore, a user could authorize the release of the geographic locations of their respective wireless devices only in response to a request stemming from the occurrence of a particular type of event. The type of event can be, for example, child abduction events. Other types of events, such as automobile collisions, could trigger the release of the geographic locations. This can be subject to a proper request by the entities to the wireless provider.

In block 420, a request is received for the identity of wireless devices in response to an occurrence of an event. The request can be received by the wireless provider from the entities. The request can also include a geographic boundary surrounding the location of the occurrence of an event.

As discussed above, the occurrence of an event can be the commission of a crime or other event, such as child abduction or automobile collision. Any event which would warrant the identification of surrounding users for questioning or other needs could classify as an event. For instance, if a hazardous substance was discharged, either intentionally or accidentally, users in the vicinity of the discharge may otherwise not be immediately aware of their possible exposure to the hazardous substance. This is but one example of a plethora of events that could warrant the identification of wireless devices, and their respective users, located in the vicinity of an event.

At block 430, a list is generated of users of wireless devices located within a predefined distance from a specific location within a period of time, wherein the list includes identifying information for each of the users. The identifying information can include the name of the users, and other identifying information for the wireless device. Many types of information can satisfy this requirement, as long as they provide a method to identify the user of the wireless device.

Figure 5:
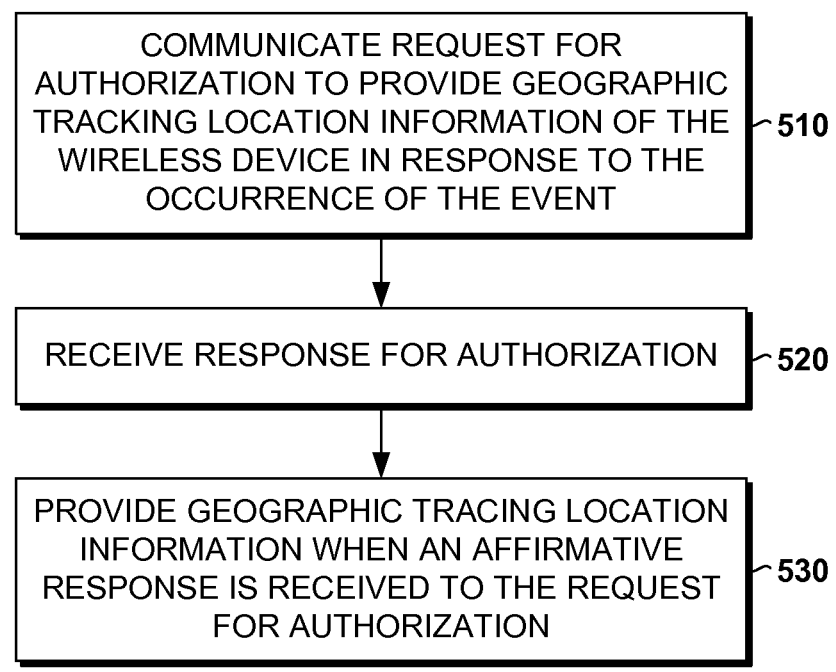
FIG. 5 depicts a flow diagram for a method for providing geographic locations of a wireless device associated with a user, in accordance with an embodiment of the invention.

Turning now to FIG. 5, a flow diagram depicting a method for providing geographic locations of a wireless device associated with a user is provided, according to an embodiment of the invention.

In block 510 the wireless provider communicates a request for authorization to provide geographic locations of the wireless device in response to the occurrence of an event. An alert can be presented to a user of a wireless device. The alert can be generated at the request of entities and can include information detailing the occurrence of an event. As discussed above, the entities can be LEOs. This information can further include the date and time of the occurrence of the event, and other details about the event. For instance, the alert could tell the user that a young child has been kidnapped from a specific location, at a given time and date. Additionally, the alert could provide an image of the kidnapped child. The request could also detail the time period for which their wireless device geographic locations would be released to the entities pending an affirmative response to the request.

In block 520, a response is received by the wireless provider to the request for authorization. The response can take the form of a user selection of an element on the user interface of their respective wireless device. For instance, a user can select an affirmative consent button to indicate their consent to the release of geographic locations for their wireless device to the entities. Alternatively, a user can select the negative response button to indicate that they do not consent to the release of the geographic locations of their respective wireless device.

At block 530, the geographic locations are provided by the wireless provider to the entities when an affirmative response is received to the request for authorization. When the user provides an affirmative response to the request, the geographic locations for the user's wireless device is made available by the wireless provider to entities, along with information identifying the user. This information can be made available to the entities through a variety of methods, such as electronically over the network.

Figure 6:
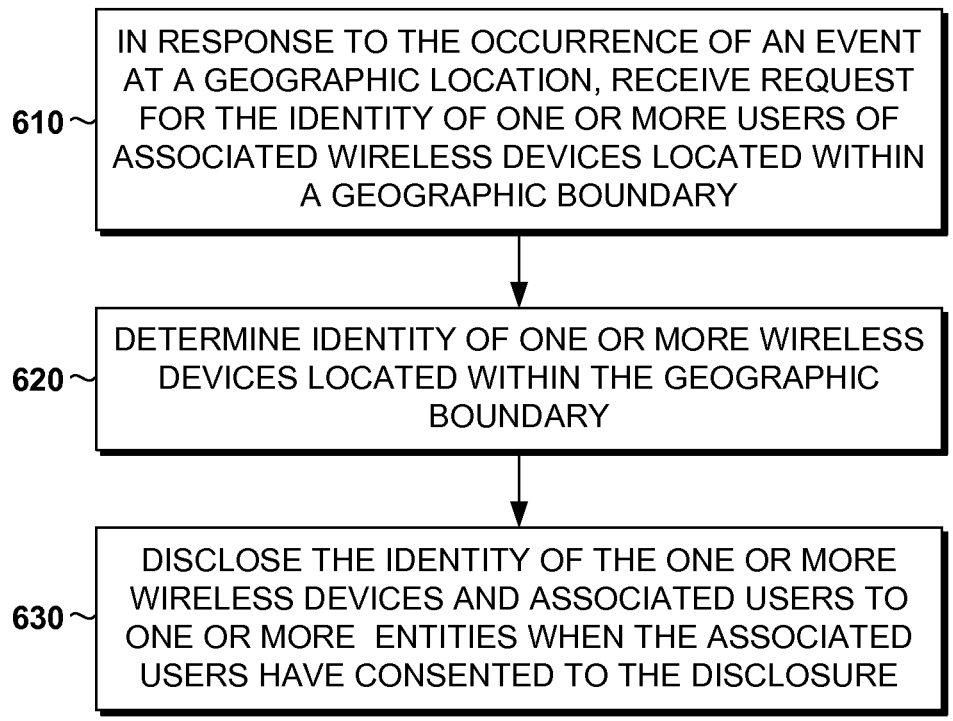
FIG. 6 depicts a flow diagram for a method for disclosing the identity of users of associated wireless devices located within a predefined geographic boundary, according to an embodiment of the invention.

With reference now to FIG. 6, a flow diagram is provided for a method for disclosing the identity of users of associated wireless devices located within a predefined geographic boundary, according to an embodiment of the invention.

In block 610, a request is received by the wireless provider for the identity of users of associated wireless devices located within a geographic boundary. The request can be generated by entities, such as LEOs, in response to the occurrence of an event at a geographic location. The geographic boundary can include the geographic location of the occurrence of the event. Further, the geographic boundary information included in the request can serve to filter the wireless devices for which a request is generated, so that requests are only generated for those devices located within a geographic radius of the occurrence of the event.

In block 620, the identity of wireless devices located within the geographic boundary is determined by the wireless provider. This can be accomplished by analyzing information describing the geographic location of all wireless devices of a wireless provider, and then filtering that information so that it only includes the identities of wireless devices located within the geographic boundary over a set period of time. This filtering could be carried out by the wireless provider, or by a third-party server, not shown in the figures.

At block 630, the identity of the wireless devices and associated users is disclosed by the wireless provider to entities when the associated users have consented to the disclosure. As discussed in relation to FIG. 5, above, a request can be generated and communicated to users of wireless devices requesting their authorization to release geographic locations associated with their respective wireless device to entities. In addition, the users of wireless devices can provide their consent to the release of geographic locations for their respective wireless devices upon a request generated in response to the occurrence of specific type of event. The request can be generated by the wireless provider at the behest of the entities.

Additionally, if users of wireless devices located with the geographic boundary have not previously consented to the release of their geographic locations in response to an occurrence of an event, the users can be presented with a request for authorization from the wireless provider to release this information to the entities.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for determining the identity of a user associated with a wireless device located near a geographic location at a specific time, the method comprising:

determining geographic locations of one or more wireless devices associated with one or more users, the determining comprising:
(1) sending an alert to the one or more wireless devices in response to an occurrence of an event at a specific location, wherein the alert requests release of the geographic locations of one or more wireless devices associated with the one or more users;
(2) receiving consent from at least one of the one or more users associated with the one or more wireless devices to release the geographic locations of the one or more wireless devices associated with the at least one user; and
(3) generating a list of the at least one user from which consent was received and the one or more wireless devices associated with the at least one user;
generating an inquiry in response to a request from a law enforcement organization, the request for identities of the one or more users of the one or more wireless devices having geographic locations corresponding to the specific location, the geographic locations and the identities being unknown to the law enforcement organization;
transmitting, to the one or more wireless devices associated with the at least one user on the list, the inquiry for consent to communicate user identifying information in response to the request received from the law enforcement organization;
and
transmitting, to the law enforcement organization, the user identifying information and the geographic locations for the one or more wireless devices corresponding to the at least one user on the list when consent is received in response to the inquiry.

2. The method of claim 1, further comprising:
confirming whether the one or more wireless devices associated with the at least one user on the list were within a predefined distance off the specific location within a period of time corresponding to the occurrence of the event.

3. The method of claim 2, wherein the list includes user identifying information for the at least one of the one or more users.

4. The method of claim 1, wherein the event is a commission of a crime.

5. The method of claim 1, further comprising:
sharing the geographic locations for the at least one user of the list with the law enforcement organization in response to the request and prior to the inquiry, wherein the geographic locations, as shared, consist of location information of the at least one user of the list during a predefined period of time corresponding to the occurrence of the event.

6. The method of claim 1, further comprising determining when the one or more wireless devices associated with at least one user of the list enters one or more bounded geographic locations.

7. The method of claim 6, wherein the inquiry is transmitted when the wireless device is determined to have entered the one or more bounded geographic locations.

8. A non-transitory computer readable media storing computer usable instructions for performing a method for determining the identity of a user associated with a wireless device located near a geographic location at a specific time, the method comprising:
sending an alert to one or more wireless devices in response to an occurrence of an event at a specific location, wherein the alert requests release of the geographic location of one or more users of the one or more wireless devices;
receiving consent from at least one of the one or more users of the wireless devices;
generating a list of the at least one consenting user;
confirming that the geographic locations of the one or more wireless devices of the at least one consenting user on the list was within a predefined distance off the specific location within a period of time corresponding to the event;
generating an inquiry in response to a request from a law enforcement organization, the request for user identifying information of any users having confirmed geographic locations with the predefined distance of the specific location within the period of time corresponding to the event, the identity and geographic locations of the one or more users being unknown to the law enforcement organization;
transmitting the inquiry to the one or more wireless devices associated with the at least one consenting user on the list having confirmed geographic locations within the predefined distance of the specific location within the period of time corresponding to the event, wherein the inquiry solicits user identifying information from the at least one consenting user and solicits consent to share the user identifying information in response to the request from the law enforcement organization; and
transmitting, to the law enforcement organization, the user identifying information and the geographic locations of the at least one consenting user when consent is received in response to the inquiry.

9. The media of claim 8, wherein the list further includes user identifying information for the at least one consenting user.

10. The media of claim 9, wherein
the geographic locations of the at least one consenting user, as shared with the law enforcement organization, is limited to location information of the one or more wireless devices during a predefined period of time corresponding the occurrence of the event.

11. The media of claim 9, further comprising determining when the one or more wireless devices associated with the at least one consenting user of the list enters a bounded geographic location.

12. The media of claim 11, wherein the inquiry is transmitted when the one or more wireless devices associated with the at least one consenting user of the list is determined to have entered the bounded geographic location.

13. The media of claim 8, wherein the event is a commission of a crime.

14. A communication system having at least one geographical position system, the communication system comprises:
at least one base station; and
a plurality of wireless devices wirelessly connected to the at least one base station, the plurality of wireless devices associated with users,
wherein the at least one base station is further configured to:
send an alert to the plurality of wireless devices in response to an occurrence of an event at a specific location, wherein the alert requests release of the geographic location of the plurality of wireless devices of the users;

receive consent from at least one of the users of the plurality of wireless devices to release the geographic location;

generate a list of the at least one consenting user;

generate an inquiry in response to a request from a law enforcement organization, the request for identities of any users of the plurality of wireless devices having geographic locations corresponding to the specific location, the identities and geographic locations of the users being unknown to the law enforcement organization;

identifying whether the geographic locations of the at least one consenting user of the list corresponds to the occurrence of the event;

transmit the inquiry to the at least one consenting user of the list identified as having geographic locations that correspond to the specific location, wherein the inquiry solicits the user identifying information of the at least one consenting user identified as having geographic locations that correspond to the specific location and solicits consent to transmit the user identifying information the law enforcement organization; and when user identifying information and consent is received from the at least one consenting user of the list identified as having geographic locations that correspond to the specific location, transmitting the user identifying information and the geographic locations to the law enforcement organization.

15. The communication system of claim 14, wherein the at least one base station is further configured to:

confirm that the geographic locations of the plurality of wireless devices of the at least one consenting user on the list were within a predefined distance of the specific location within a period of time corresponding to the occurrence of the event.

16. The communication system of claim 14, wherein the geographic locations transmitted to the law enforcement organization consists of location information limited to a predefined period of time surrounding the time of the occurrence of the event.

17. The communication system of claim 14, wherein the at least one base station is further configured to:

when consent to transmit user identified information is not received from the at least one consenting user of the list identified as having geographic locations that correspond to the specific location, transmitting the geographic locations without user identifying information to the law enforcement organization.

18. The communication system of claim 14, wherein the at least one base station is further configured to:

transmitting the geographic locations for the at least one consenting user of the list to the law enforcement organization in response to the request and prior to the inquiry.

19. The communication system of claim 14, wherein the at least one base station is further configured to:

prior to transmitting the inquiry, verifying authenticity of the request from the law enforcement organization.

* * * * *